June 12, 1962 J. A. SCHAEDER ETAL 3,039,105

DIRECTLY REGISTERING RECORDING APPARATUS

Filed Sept. 23, 1959 2 Sheets-Sheet 1

INVENTORS
JOHANN ALBRECHT SCHAEDER
GERHARD WALTHER

DIRECTLY REGISTERING RECORDING APPARATUS

INVENTORS
JOHANN ALBRECHT SCHAEDER
GERHARD WALTHER 3,039,105
Patented June 12, 1962

3,039,105

DIRECTLY REGISTERING RECORDING APPARATUS

Johann Albrecht Schaeder, Merzhausen, near Freiburg im Breisgau, and Gerhard Walther, Hochdorf, near Freiburg im Breisgau, Germany, assignors to Fritz Hellige & Co. G.m.b.H., Freiburg im Breisgau, Germany, a German company Filed Sept. 23, 1959, Ser. No. 842,178
Claims priority, application Germany Sept. 26, 1958
6 Claims. (Cl. 346—105)

Figure 1:
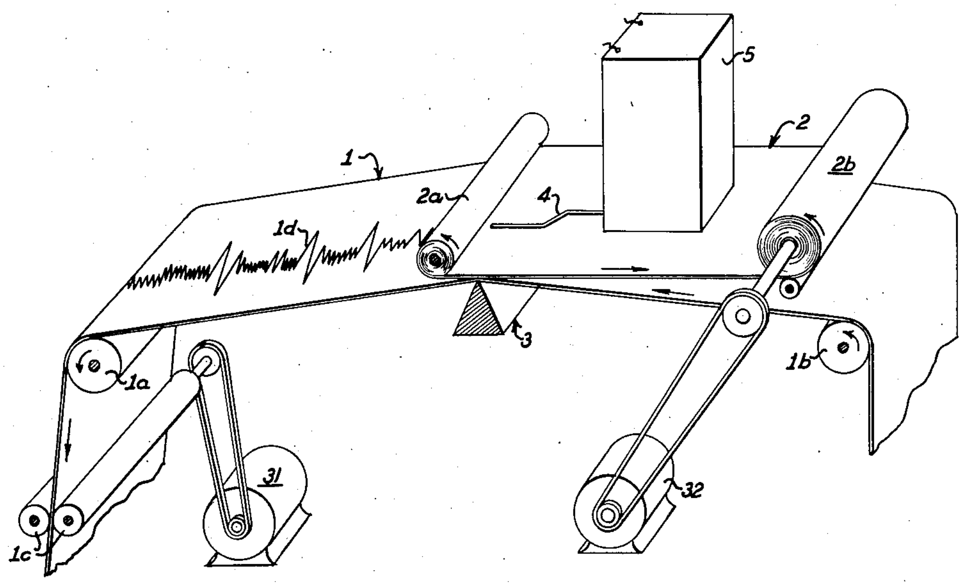

The invention relates to recording apparatus suitable for technical, for biological or for medico-diagnostic measurements such as electro-cardiographs and more particularly to recording apparatus in which deflections of a recording indicator are directly registered and are readily visible.

Direct registration of the indicator deflections is preferred to photographic registration, because the latter is very expensive if, as is normally the case, record carriers of considerable length are required for uninterrupted recording during a comparatively long period. Consequently, a method has recently been used for the said purposes for producing the tracing on the record carrier, which method works, as in the case of typewriters, with a pigment carrier, for example, in the present case a strip of carbon paper. The record carrier runs over a recording base, more particularly over a transversely disposed recording edge for the purpose of a straight line record, and past the indicator or recording arm of the measuring instrument constructed while the pigment carrier is also guided over said recording edge, preferably between the record carrier and the recording arm and with a speed relative to the record carrier, so that, due to the friction from the pressure of the recording arm, a trace of pigment, following the deflection of the writing arm, is transferred to the record carrier.

However, this method of recording, which is becoming popular, also suffers from a defect which may be regarded purely as being conditioned by the method and may be seen in the feature that the pigment carrier in the usual arrangement covers the pigment trace recorded and thus the direct co-ordination of the movement of the recording arm and the trace, which appears only later on the record carrier at some place in the apparatus, is not possible. The same applies if the pigment carrier is arranged between the recording edge and the record carrier, since the trace is produced on the underside of the record carrier and is not directly visible from above.

In this regard, technical progress may be achieved if, as envisaged by the present invention, in the case of the described type of recording apparatus, the record carrier, pigment carrier and recording arm are arranged so that both the deflections of the recording arm and the pigment trace which has just been registered are visible substantially simultaneously from the same place, if preferred with the assistance of other means such as optical means.

Thus the invention is based on the knowledge that it is not in the nature of the pigment recording method that, in contrast to other, but more expansive and more complicated, recording methods, the deflection of the recording arm and the production of the pigment trace are not both simultaneously visible from the same place of observation.

A precursor of the invention satisfied itself, particularly for the purpose of adjusting the zero line or the amplitude, merely with simultaneous visual observation of the pigment trace and an indication produced by a light which was to be produced adjacent to the tracing by a mirror secured to the recording arm or the armature of the measuring instrument. Since, however, the recording arm was not visible itself in such a method it was not possible to be quite sure that the recording arm was ready for use.

According to one feature of the present invention recording apparatus comprises a recording base, a measuring instrument for receiving said current or voltage variations and having an indicator in the form of a recording arm movable across said base responsively to said variations, means for supporting and traversing a record carrier between said recording base and said recording arm, and means for supporting and traversing a pigment carrier also between said recording base and said recording arm with a coloured or pigmented face of said pigment carrier facing said record carrier and without obstructing visibility of a colour or pigment trace substantially immediately after it is produced on said record carrier by transfer of colour or pigment thereto from said pigment carrier by pressure from said recording arm, movement of said recording arm being visible simultaneously with said trace substantially immediately after it is produced.

According to another feature of the present invention recording apparatus comprises a recording base, a measuring instrument for receiving said current or voltage variations and having an indicator in the form of a recording arm movable across said base responsively to said variations, means for supporting and traversing a record carrier between said recording base and said recording arm, means for supporting and traversing a pigment carrier also between said recording base and said recording arm with a coloured or pigmented face of said pigment carrier facing said record carrier and without obstructing visibility of a colour or pigment trace substantially immediately after it is produced on said record carrier by transfer of colour or pigment thereto from said pigment carrier by pressure from said recording arm, and optical means for simultaneously rendering movement of said recording arm visible with said trace substantially immediately after it is produced.

Figure 2A:
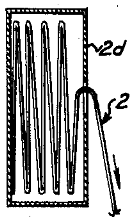
Figure 2:
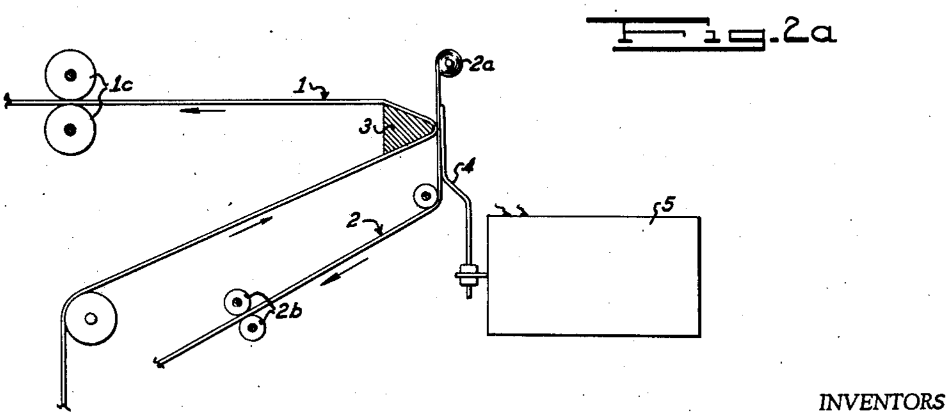
Figure 3:
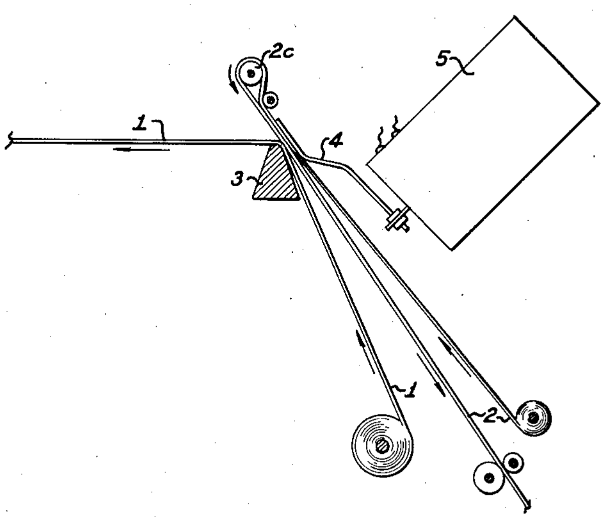
Figure 4:
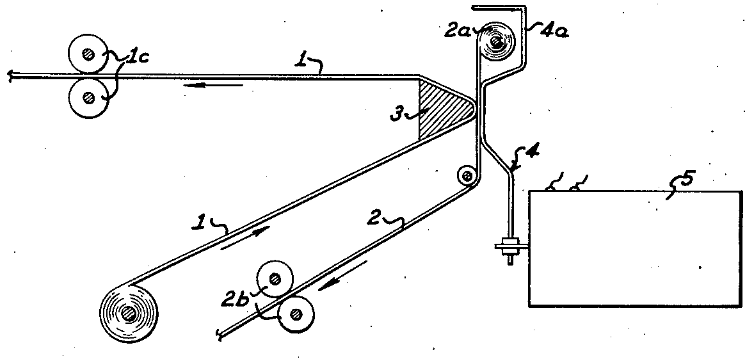

The invention is further described by way of example with reference to the accompanying diagrammatic drawings in which:

FIG. 1 is a diagrammatic perspective view of a detail of recording apparatus according to one embodiment of the present invention, FIG. 2 is a diagrammatic cross section of a second embodiment of recording apparatus according to the invention, FIG. 2*a* shows an alternative storage arrangement for the pigment carrier more particularly of the embodiment of FIG. 2, FIGS. 3 and 4 are diagrammatic cross sections of two further embodiments of the invention.

In the various embodiments of the invention shown in the drawings like parts are indicated by like reference numerals.

Referring first of all generally to all embodiments a record carrier 1 is passed over a transversely disposed recording edge 3 in one direction and in all embodiments a pigment carrier 2 is passed across the edge 3 in the opposite direction. A recording arm 4 is attached to an armature of a measuring instrument 5 which receives electrical impulses to be recorded. The recording arm 4 co-operates with the recording edge 3 to press the pigment carrier into contact with the record carrier 1 to mark a trace thereon.

In the embodiments of FIGS. 1 and 2 the pigment carrier 2 is arranged between the record carrier 1 and the recording arm 4, the pigment carrier being un-wound from a comparatively slim supply roll 2*a*, or alternatively wound on such a slim roll, which roll is located close to the point of the recording arm 4 but does not impede its movement thereby, the pigment trace 1*d* recorded on the record carrier 1 and the recording part of the arm 4 becoming thereby substantially simultaneously visible, making it possible to co-ordinate the two. The record carrier 1 is guided over the recording edge 3 by means of friction rollers 1*c* and preferably over the edge at an acute angle as in the embodiment of FIG. 2. In certain circumstances other guide rollers 1*a* and 1*b* are provided for the record carrier as shown in FIG. 1. The pigment carrier, e.g. a strip of carbon paper, unwound from a supply roll 2*a* and is driven by rolls 2*b*, to convey the pigment carrier in the opposite direction to the record carrier and between the record carrier and the recording arm 4 pivotally journalled in the measuring instrument 5. Friction contact occurs between the two strips at the point of pressure between the recording arm and the recording edge which leads to sufficient transfer of pigment to the record carrier to trace a record thereon.

FIG. 2 shows a preferred arrangement for observation from above. The record carrier 1 is conveyed from below, preferably inclined from below at an acute angle on to the recording edge 3 and removed horizontally from said edge. The pigment carrier 2, is moved downwardly from a slim storage roll 2*a*, journalled substantially directly perpendicularly above the recording edge 3 perpendicularly between the recording arm 4 and the record carrier 1 by meeans of the friction rollers 2*b*. The measuring instrument 5 is arranged below the writing edge 3 so that the recording arm 4 has a horizontal pivotal axis and is located substantially perpendicularly in the zero position. Slight curvature of the recording arm 4 reduces interference of its deflection due to the movement of the pigment carrier 2.

In FIG. 2*a* a concertina-like storage arrangement of the record carrier 2*a* in a supply box 2*d* is shown. This is preferably mounted rather close to the point of the recording arm, whilst not impeding the movement of the recording arm and having the advantagee that it can be much thinner than a supply roll 2*a* and thereby form a smaller obstacle to viewing.

As can be seen in the embodiment of FIG. 3 a very favourable result may be achieved by the use of slim guide rollers 2*c*, also arranged in pairs if preferred, for the pigment carrier 2 since they are much thinner and slimmer than supply rolls and cannot vary in their thickness and consequently they form a smaller impediment to the simultaneous observation of the recording arm and the recoiled pigment tracing. These guide rollers 2*c* should be mounted parallel to the recording edge 3 close to the point of the recording arm 4 so that the pigment carrier 2 is moved in a double layer between the recording arm and the record carrier, with the layer of pigment on the outer side. By the use of a pair of guide rollers 2*c*, as shown in FIG. 3, it is also ensured that the strip of record carrier 1 and the two strip portions of the pigment carrier 2, are located extremely closely one above the other with a very small space between them and the slight pressure of the recording arm is sufficient to produce the pigment trace. The positions of the various members can be selected differently from those shown in FIG. 3 for example, as shown in FIG. 2.

In the embodiment of the invention shown in FIG. 4, an indicator 4*a* is secured to the point of the writing arm 4 and is as thin and light as possible. The indicator 4*a* extends round a supply roll 2*a* for the pigment carrier 2 and follows the movement of the recording arm so that, when seen from above, the coordination of the movement of the recording arm with the visible pigment trace recorded may be ensured. In certain circumstances the view of both criteria can be further improved by lenses and the like.

The invention may be very easily put into practice if the speed of the pigment carrier is very much less than that of the record carrier, so that slim supply rolls for the pigment carrier or very thin storage cases for a concertina-like folded storage arrangement can be used which themselves represent only a slight obstacle to observation. Combined packages can be prepared of record carrier paper and pigment paper which packages contain a slim roll of pigment paper inserted in the hollow core of a larger roll of record carrier paper.

In all embodiments of the invention the driving-means 31 for the record carrier 1 and the driving-means 32 for the pigment carrier 2 must be arranged as indicated in FIGURE 1.

We claim:

1. Direct and continuously registering recording apparatus comprising means for traversing a record carrier in a first direction, a recording edge fixedly supported with respect to said record carrier and extending in a direction transverse to the direction of the record carrier, a pigment carrier, supply means for supplying said pigment carrier adjacent said recording edge, means for guiding said pigment carrier from said supply means past said recording edge in substantial alignment with said record carrier and at a different speed from that of the record carrier, said pigment carrier and record carrier being substantially coextensive in width, the record carrier being between said recording edge and said pigment carrier, the pigment carrier including a pigmented face facing the record carrier, means for receiving impulses to be recorded and including a movable arm positioned adjacent said pigment carrier at said recording edge, means defining a pivot axis for said arm extending perpendicular to said recording edge and permitting said arm to move along said recording edge in response to said impulses whereby the arm impresses a trace on said record carrier, said supply means for said pigment carrier being positioned closely adjacent said arm and permitting free movement thereof while exposing said trace so that movement of said arm and the trace corresponding thereto is visible simultaneously and substantially immediately after the trace is produced.

2. Apparatus as claimed in claim 1 wherein the supply means for said pigment carrier comprises a relatively slim supply roll supported substantially parallel to the recording edge, the means for guiding said pigment carrier advancing said pigment carrier in a direction opposite to that of the record carrier.

3. Apparatus as claimed in claim 1 wherein the supply means for said pigment carrier comprises means defining a relatively slim container for storing said pigment carrier therein in folded relation, the means for guiding said pigment carrier advancing said pigment carrier in a direction opposite to that of the record carrier.

4. Apparatus as claimed in claim 1 wherein said means for traversing said record carrier causes the latter to form an angle at said recording edge, the path of the record carrier leaving said recording edge forming an acute angle with respect to the path of said pigment carrier to expose the trace at said recording edge, said movable arm extending around said supply means and into said acute angle formed by the record carrier and the pigment carrier whereby movement of the arm and the trace is visible simultaneously.

5. Apparatus as claimed in claim 4 wherein said pigment carrier is carbon paper.

6. Direct and continuously registering recording apparatus comprising means for traversing a record carrier in a first direction, a recording edge fixedly supported with respect to said record carrier and extending in a direction transverse to the direction of the record carrier, a pigment carrier, a supply roll for said pigment carrier, a direction reversing roller supported adjacent said recording edge and extending substantially parallel thereto, means for guiding the pigment carrier from said supply roll in the direction of advancement of the record carrier and around said reversing roller, the pigment carrier being guided from said reversing roller in a direction opposite to that of the direction of the record carrier and adjacent said carrier, said pigment carrier being guided from said reversing roller such that it is in substantial alignment with said record carrier, the pigment carrier being coextensive in width with said record carrier, the record carrier being between said recording edge and said pigment carrier, the pigment carrier including a pigmented face facing the record carrier, means for receiving impulses to be recorded and including a movable arm positioned adjacent said pigment carrier at said recording edge, means defining a pivot axis for said arm extending perpendicular to said recording edge and permitting said arm to move along said recording edge in response to said impulses whereby the arm impresses a trace on said record carrier, said reversing roller being positioned closely adjacent said arm and permitting free movement thereof while exposing said trace so that movement of said arm and the trace corresponding thereto is visible simultaneously and substantially immediately after the trace is produced.

References Cited in the file of this patent

UNITED STATES PATENTS

| | | |
|---|---|---|
| 1,564,560 | Grisdale | Dec. 8, 1925 |
| 1,706,046 | Tisdale | Mar. 19, 1929 |
| 2,044,586 | Marcellus | June 16, 1936 |
| 2,156,289 | Hoy | May 2, 1939 |
| 2,424,363 | Miller | July 22, 1947 |
| 2,446,400 | Woolley | Aug. 3, 1948 |
| 2,454,247 | Young | Nov. 16, 1948 |
| 2,508,562 | Bonner | May 23, 1950 |
| 2,614,460 | Miller | Oct. 21, 1952 |
| 2,703,269 | Wood | Mar. 1, 1955 |

FOREIGN PATENTS

| | | |
|---|---|---|
| 279,775 | Germany | Mar. 1, 1914 |
| 753,993 | Germany | Dec. 8, 1952 |
| 1,113,100 | France | Mar. 23, 1956 |